United States Patent [19]

Brandt et al.

[11] Patent Number: 4,523,926
[45] Date of Patent: Jun. 18, 1985

[54] MIXTURES OF DISPERSE DYESTUFFS

[75] Inventors: Horst Brandt, Odenthal; Günter Gehrke; Rolf Müders, both of Cologne; Hans-Günter Otten, Leverkusen; Dieter Wiegner, Odenthal, all of Fed. Rep. of Germany

[73] Assignee: Bayer Aktiengesellschaft, Leverkusen, Fed. Rep. of Germany

[21] Appl. No.: 640,433

[22] Filed: Aug. 13, 1984

[30] Foreign Application Priority Data

Aug. 31, 1983 [DE] Fed. Rep. of Germany ....... 3331437
Nov. 25, 1983 [DE] Fed. Rep. of Germany ....... 3342691

[51] Int. Cl.³ ............................................. C09B 67/22
[52] U.S. Cl. ........................................... 8/639; 8/643; 8/921; 8/922
[58] Field of Search ................................ 8/639, 643

[56] References Cited

U.S. PATENT DOCUMENTS 2,990,413 6/1961 Gehrke et al. ............... 260/380
4,185,959 1/1980 Imada et al. ................. 8/638
4,374,642 2/1983 Brandt et al. ................. 8/639

Primary Examiner—A. Lionel Clingman
Attorney, Agent, or Firm—Sprung Horn Kramer & Woods

[57] ABSTRACT

Dyestuff mixtures of
(a) an anthraquinone dyestuff of the formula

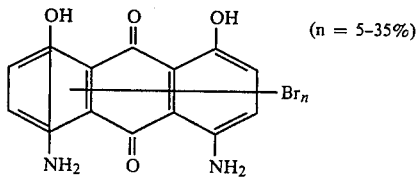

(b) a preferably blue azo dyestuff of the formula

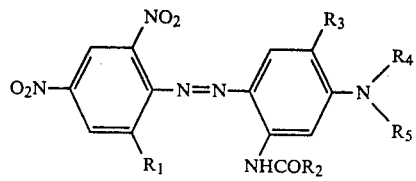

wherein
$R_1$ = H or halogen,
$R_2$ = alkyl,
$R_3$ = H or alkoxy, and
$R_4$ and $R_5$ = alkyl or alkenyl,
and
(c), optionally, shading dyestuffs are particularly inexpensive and are distinguished by good dyebath stability and application properties.

8 Claims, No Drawings

MIXTURES OF DISPERSE DYESTUFFS

The invention relates to a mixture of
(a) 60–90% by weight of a brominated diaminodihydroxyanthraquinone of the general formula

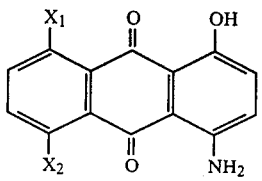

wherein $X_1$ and $X_2 =$ OH or $NH_2$, but $X_1 \neq X_2$, with an average bromine content of 5–35, preferably 10–30,%, (b) 40–10% by weight of an azo dyestuff of the formula

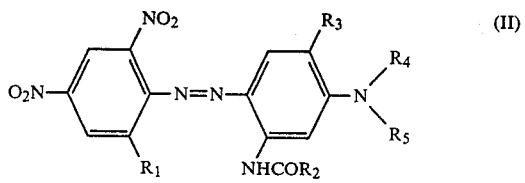

wherein
$R_1 =$ H, Cl or Br,
$R_2 = C_1$-$C_4$-alkyl,
$R_3 =$ H or $C_1$-$C_4$-alkoxy, and
$R_4$ and $R_5 =$ H, $C_1$-$C_4$-alkyl, $C_3H_5$-alkenyl or $C_1$-$C_2$-alkoxy-$C_2$-$C_4$-alkyl,
and (c) 0–10% by weight of one or more shading dyestuffs.

The alkyl and alkoxy radicals can have substituents. Preferred substituents for the $R_3$-$R_5$ alkoxy and alkyl radicals are $C_1$-$C_4$-alkoxy radicals. Alkenyl radicals are preferably allyl radicals.

The dyestuff mixtures preferably have a mixing ratio of I:II of 75–85:25–15% (relative to unfinished dry dyestuff). A ratio of 80–84:20–16% is very highly preferable.

The components (a) and (b) can be not only individual dyestuffs but also mixtures of various dyestuffs of the formulae (I) and (II).

The azo dyestuffs of the formula (II) are generally known (cf. Nos. EP-A 38,527, EP-A 36,252, BE-A 643,774, DE-A 2,940,292, 2,818,653, IP-A 49/13,479 and U.S. Pat. No. 4,185,959), particular preference being given to the blue types, i.e. those of the formula (II) wherein $R_1 =$ Br or Cl, $R_2 =$ $CH_3$, $C_2H_5$ or $C_3H_7$, $R_3 =$ H, $OCH_3$ or $OCH_2CH_2OCH_3$, $R_4 =$ H, $CH_3$, $C_2H_5$, $C_3H_7$, $CH_2CH_2OCH_3$ or $CH_2CH=CH_2$ and $R_5 =$ $CH_3$, $C_2H_5$, $C_3H_7$, $CH_2CH_2OCH_3$ or $CH_2$—$CH=CH_2$.

Dyestuffs of the formula II wherein $R_1 =$ Cl or Br, $R_2 =$ $CH_3$ or $C_2H_5$, $R_3 =$ H, and $R_4$ and $R_5 =$ $C_2H_5$ are very particularly preferable.

THe brominated anthraquinone dyestuffs covered by (a) are likewise known (cf. U.S. Pat. No. 2,990,413).

The bromination products of 1,8-dihydroxy-4,5-diaminoanthraquinone with the abovementioned bromine contents are preferable, a content of 15–25% being particularly preferable.

Particularly advantageous application properties are displayed by those dyestuff mixtures according to the invention which contain as component (b) the type mentioned in the preceding paragraph, which is obtained by brominating a 1,8-dihydroxy-4,5-diaminoanthraquinone which is substantially free (i.e. contains less than 10, preferably less than 5% by weight) of β-substitution products, which are frequently present in technical products as a result of the method of synthesis employed. Such pure dihydroxydiamino compounds can be prepared, for example, as described in No. EP-A 0,015,486, where the nitration of 1,8-dihydroxy(dimethoxy)anthraquinone is followed by precipitation of the β-nitration products through the choice of certain acid concentrations, and the 1,8-dihydroxy-4,5-dinitroanthraquinone substantially freed of the these impurities is reduced in conventional manner.

The dyestuff mixtures according to the invention are highly suitable for dyeing polyester and cellulose triacetate fibre materials using conventional dyeing methods.

If desired the mixtures can additionally be shaded somewhat, for example by addition of a commercially available yellow disperse dyestuff. The shading dyestuff content is preferably at most 5% by weight (relative to the total mixture).

The mixtures according to the invention, in particular the preferred blue mixtures of azo dyestuffs of the formula (II) wherein $R_1 =$ Cl/Br, $R_2 =$ $CH_2/C_2H_5$, $R_3$ H, and $R_4/R_5 =$ $C_2H_5$ with te brominated 1,8-dihydroxyanthraquinone types substantially free of β-substitution products and having the particularly preferred bromine contents are distinguished by high dyebath stability, good levelling properties and low tendency towards catalytic fading.

EXAMPLE 1

Ground pastes of dyestuffs A and B, which each contain about 20% of dyestuff and 20% of ligninsulphonate-based dispersant, are carefully mixed together with further ligninsulphonate-based dispersant, anionic wetting agents, as well as dedusting and defoaming agents and dried in a spray-dryer (inlet temperature: 140° C.; outlet temperature: 65° C.). This gives a dyestuff powder of the following composition:

24.4% of dyestuff A
4.0% of dyestuff B
62.0% of dispersant
0.2% of wetting agent
0.1% of defoamer
0.3% of dedusting agent
8.1% of residual moisture A polyester fabric is introduced at a liquor ratio of 20:1 into a dyebath which contains per liter in addition to the 1 g of an anionic dispersant 1 g of monosodium hydrogenphosphate and acetic acid (for setting a pH of 4.5), 1% of the dyestuff preparation described above. The bath is heated to 130° C., and dyeing is carried out at this temperature for 1–1.5 hours. The dyed goods are then rinsed and dried.

This gives a level blue dyeing of excellent fastness standard.

Dyestuff A:

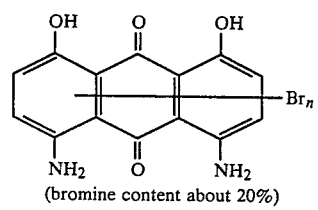

(bromine content about 20%)

Dyestuff B:

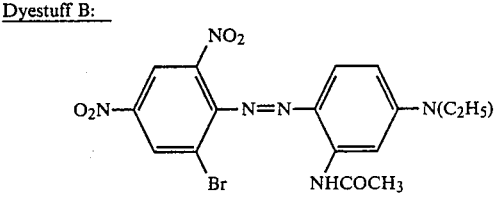

EXAMPLE 2

A polyester fabric is dyed under the dyeing conditions given in Example 1, except that the dyeing liquor contains a dyestuff mixture, prepared as in Example 1, of (relative to pure dyestuff): 0.090% of C.I. Disperse Orange 29, 0.0625% of C.I. Disperse Red 82 and 1.04% of the mixture of dyestuffs A and B (ratio 6:1). This gives a deep navy dyeing.

EXAMPLE 3

Example 2 is repeated, except that a mixture of the following composition is employed:
0.77% of C.I. Disperse Orange 29
0.13% of C.I. Disperse Red 82
0.17% of mixture of A and B
This gives a dark brown dyeing.

EXAMPLE 4

Example 1 is repeated, except that dyestuff B is replaced by the dyestuff of the formula

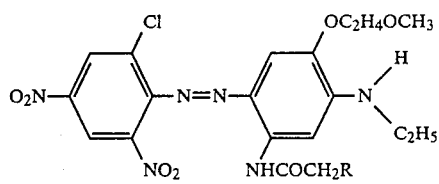

~50% by weight of R=CH$_3$
~50% by weight of R=C$_2$H$_5$
in an amount that the resulting dyestuff powder has the following composition:
20.3% of dyestuff A
10.0% of dyestuff C
61.0% of ligninsulfonate-based dispersant
0.2% of defoamer
0.5% of dedusting agent
8.0% of residual moisture
The dyestuff produces on polyester a blue dyeing of excellent fastness properties.

EXAMPLE 5

A dyestuff powder is prepared as described in Example 1 to have the following composition:
19.5% of dyestuff D
4.0% of dyestuff B
66.5% of dispersant
0.2% of wetting agent
0.1% of defoamer
0.4% of dedusting agent
9.3% of residual moisture
If a polyester fabric is dyed with this dyestuff powder as described in Example 1, this gives a completely level blue dyeing.

Dyestuff D:

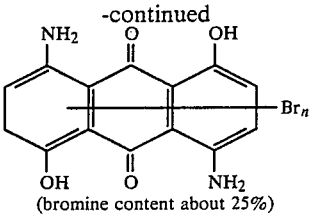

(bromine content about 25%)

EXAMPLE 6

A likewise satisfactory blue dyeing is obtained by using a dyestuff mixture of 12% of dyestuff A, 10% of dyestuff D, 4% of dyestuff B and 64% of dispersant (balance=auxiliaries and water).

We claim:
1. Dyestuff mixture containing
   (a) 60-90% by weight of a brominated diaminodihydroxyanthraquinone of the general formula

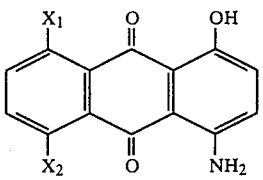

wherein X$_1$ and X$_2$=OH or NH$_2$, but X$_1$≠X$_2$, with an average bromine content of 5-35%,
   (b) 40-10% by weight of an azo dyestuff of the formula

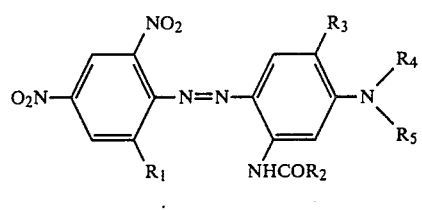

wherein
   R$_1$=H, Cl or Br,
   R$_2$=C$_1$-C$_4$-alkyl,
   R$_3$=H or C$_1$-C$_4$-alkoxy, and
   R$_4$ and R$_5$=H, C$_1$-C$_4$-alkyl, C$_3$H$_5$-alkenyl or C$_1$-C$_2$-alkoxy-C$_2$-C$_4$-alkyl,
   and
   (c) 0-10% by weight of one or more shading dyestuffs.

2. Dyestuff mixture according to claim 1, characterised in that the mixing ratio of a:b is 75-85:25-15% by weight.

3. Dyestuff mixture according to claim 1, characterised in that the component of the formula I is a brominated 1,8-dihydroxy-4,5-diaminoanthraquinone with an average bromine content of 10-30%.

4. Dyestuff mixture according to claim 1, characterised in that the component of the formula I is a brominated 1,8-dihydroxy-4,5-diaminoanthraquinone which is substantially free of β-isomers.

5. Dyestuff mixture according to claim 1, characterised in that the component of the formula II is 2,4-dinitro-6-bromo-2'-acetylamino-4'-(N,N'-diethyl)-amino-1,1'-azobenzene.

6. A dyestuff mixture according to claim 1 wherein said average bromine context of said brominated diaminodihydroxyanthraquinone is 10-30%.

7. A dyestuff mixture according to claim 3 wherein said average bromine content is 15-25%.

8. The process to dye or print polyester and cellulose triacetate fibres with the dyestuff mixture according to claim 1.

* * * * *